United States Patent
Danzinger et al.

(10) Patent No.: US 9,446,986 B2
(45) Date of Patent: Sep. 20, 2016

(54) DISPERSANT FOR HYDRAULICALLY SETTING SYSTEMS

(71) Applicants: SIKA TECHNOLOGY AG, Baar (CH); SIKA (CHINA) LTD., Suzhou, Jiangsu (CN)

(72) Inventors: Michael Danzinger, Salzburg (CH); Jennifer Liu, Suzhou (CN); Ueli Sulser, Unterengstringen (CH); Jürg Widmer, Zürich (CH)

(73) Assignees: SIKA TECHNOLOGY AG, Baar (CH); SIKA (CHINA) LTD., Suzhou (CN)

( * ) Notice: Subject to any disclaimer, the term of this patent is extended or adjusted under 35 U.S.C. 154(b) by 0 days.

(21) Appl. No.: 14/442,560

(22) PCT Filed: Nov. 8, 2013

(86) PCT No.: PCT/EP2013/073337
§ 371 (c)(1),
(2) Date: May 13, 2015

(87) PCT Pub. No.: WO2014/075996
PCT Pub. Date: May 22, 2014

(65) Prior Publication Data
US 2016/0130182 A1 May 12, 2016

(30) Foreign Application Priority Data
Nov. 13, 2012 (CN) .......................... 2012 1 0451793

(51) Int. Cl.
| C04B 24/26 | (2006.01) |
| C08F 220/06 | (2006.01) |
| C08F 216/20 | (2006.01) |
| C08F 216/14 | (2006.01) |
| C04B 24/24 | (2006.01) |
| C04B 28/02 | (2006.01) |
| C04B 28/14 | (2006.01) |
| C08F 230/02 | (2006.01) |
| C04B 103/40 | (2006.01) |

(52) U.S. Cl.
CPC .......... *C04B 24/2694* (2013.01); *C04B 24/246* (2013.01); *C04B 28/02* (2013.01); *C04B 28/14* (2013.01); *C08F 216/1416* (2013.01); *C08F 216/20* (2013.01); *C08F 220/06* (2013.01); *C04B 2103/408* (2013.01); *C08F 230/02* (2013.01)

(58) Field of Classification Search
CPC . C04B 24/2694; C08F 220/06; C08F 216/20
USPC ........................................................ 524/547
See application file for complete search history.

(56) References Cited

U.S. PATENT DOCUMENTS

2009/0163622 A1* 6/2009 Albrecht ............ C04B 24/2605
524/5

FOREIGN PATENT DOCUMENTS

| CN | 101659530 A | 3/2010 | |
| DE | 102005061153 A1 | 6/2007 | |
| GB | 2291060 A * | 1/1996 | ........... A61K 6/0017 |

OTHER PUBLICATIONS

Dec. 16, 2015 Office Action issued in Chinese Patent Application No. 201210451793.X.
Jan. 29, 2014 International Search Report issued in International Patent Application No. PCT/EP2013/073337.
Jan. 29, 2014 International Written Opinion issued in International Patent Application No. PCT/EP2013/073337.
May 18, 2016 European Offfice Action issued in European Application No. 13 791 966.8.
Jun. 14, 2016 Notification of the Second Office Action issued in Chinese Application No. 201210451793.X.

* cited by examiner

*Primary Examiner* — Michael M Bernshteyn
(74) *Attorney, Agent, or Firm* — Oliff PLC

(57) ABSTRACT

A copolymer, in particular a dispersing agent for hydraulically setting systems, includes at least three structural units S1, S2, S3 and optionally a further structural unit S4.

16 Claims, No Drawings

DISPERSANT FOR HYDRAULICALLY SETTING SYSTEMS

TECHNICAL FIELD

The present invention pertains to copolymers for hydraulically setting systems. Moreover, the invention relates to a method for preparation of a copolymer and its use.

PRIOR ART

Polymers that consist of α,β-unsaturated carboxylic acids with polyoxyalkylene side chains have been used in concrete technology as dispersing agents, in particular as plasticizers. The addition of such polymers to cements allows to reduce the water content, which is advantageous for the processing and stability of the concrete. These polymers have a comb polymer structure. There is a series of such comb polymers which, besides ester and carboxylic acid groups, also have amide groups. Prior art essentially used two processes for producing generic comb polymers. In a common process such comb polymers are prepared from unsaturated carboxylic acid, ester, ether, amide, and/or imide-functional monomers by free-radical polymerizations. In another known process the polymers are prepared in a so-called polymer-analogous reaction from a polycarboxylic acid comprising at least one acrylic acid unit or at least one methacrylic acid unit and the respective alcohols and/or amines. In this process, the comb polymer is obtained by an esterification and/or amidation of the polycarboxylic acid or a salt or an anhydride thereof.

Despite the improvement regarding plastification, however, it is still a challenge to adapt to the various processing conditions globally used in the manufacturing of concrete. This is due to the various types of local climate, cements, aggregates, cement replacement fillers, etc., and the broad field of use, such as ready-mix concrete, air-placed concrete, self-compacting concrete or concrete mixed on site. Therefore, special additives meeting completely different requirements must be provided.

This results in a need for new additives which can be used as dispersants, in particular as plasticizers for hydraulically setting systems and in particular for new fields of use.

A particular problem with the known plasticizers based on comb polymers is that due to the very strong water reduction the processing is good in the beginning, however, subsequently quickly deteriorates, which results in poor processing of the hydraulically setting composition within a short time.

OBJECT OF THE INVENTION

It is the object of the invention to solve the above-mentioned problems. New plasticizers for use in settable compositions having special and advantageous properties are to be provided. The polymers are to provide a sufficient plasticizing effect in hydraulically setting compositions. In particular, it is the object of the invention to provide polymers with good long-term processing. Especially, polymers which are effective under varying conditions or essentially independently of the settable compositions should be made available.

DISCLOSURE OF THE INVENTION

Surprisingly, the object of the invention is achieved by copolymers, uses and methods according to the patent claims.

The subject matter of the invention is a copolymer, in particular a dispersing agent for hydraulically setting systems, comprising:

i) 1 to 30 mol-%, especially 5 to 30 mol-%, in particular 10 to 20 mol-%, of at least one structural unit S1 of formula I

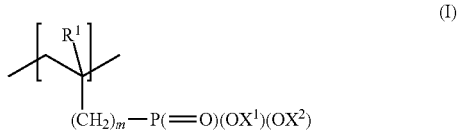

where
$R^1$, independently of one another, is H or $CH_3$;
m, independently of one other, is represented by one of the integers 0, 1, 2 or 3;
$X^1$ and $X^2$, independently of one other, is a hydrogen atom, an alkali metal ion, an alkaline earth metal ion, a di- or trivalent metal ion, an ammonium ion or an organic ammonium group, a $C_1$-$C_3$ alkyl group, a hydroxyethyl group, a hydroxypropyl group or a group of formula $(A^1O)_k$—$R^2$, wherein
  $A^1$, independently of one another, is represented by a $C_2$-$C_4$ alkylene group;
  $R^2$, independently of each other, is a hydrogen atom, a $C_1$-$C_{10}$ alkyl group, a phenyl group or a $C_7$-$C_{12}$ arylalkyl group,
  k, independently of one other, is represented by an integer of from 2 to 350;

ii) 10 to 80 mol-%, especially 20 to 40 mol-%, in particular 25 to 30 mol-%, of at least one structural unit S2 of formula II

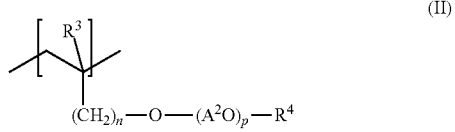

where
$R^3$, independently of one another, is H or $CH_3$;
$R^4$, independently of one another, is represented by a hydrogen atom, a $C_1$-$C_{10}$ alkyl group, a phenyl group or a $C_7$-$C_{12}$ arylalkyl group;
$A^2$, independently of one another, is represented by a $C_2$-$C_4$ alkylene group;
n, independently of one another, is represented by an integer from 0 to 2;
p, independently of one another, is represented by an integer from 1 to 350;

iii) 5 to 80 mol-%, especially 25 to 70 mol-%, in particular 50 to 70 mol-%, of at least one structural unit S3 of formula III

where
R$^5$, independently of one another, is H or CH$_3$;
Y, independently of one another, is represented by hydrogen, an alkali metal ion, alkali earth metal ion, a divalent or trivalent metal ion, a C$_1$-C$_3$ alkyl group, a hydroxyalkyl with 1 to 4 carbon atoms, or a rest of formula (A$^3$O)$_q$, where
A$^3$, independently of one another, is represented by a C$_2$-C$_4$ alkylene group and
q, independently of one another, is represented by an integer from 1 to 350;
iv) 0 to 40 mol-%, especially 0 to 25 mol-%, of at least one additional structural unit S4 which differs from the structural units S1, S2 and S3.

In particular, the relative amount of each structural unit S1, S2, S3 and S4 is based in each case on the total number of all structural units of the copolymer.

Especially, the inventive copolymers show a good plasticizing effect in hydraulically setting compositions and at the same time allow for a good long-term processing of such compositions. Furthermore, it could be shown that the inventive copolymers are effective under varying conditions. Especially, the polymers have been proven to be effective in terms of plasticizing and long-term processing in hydraulically setting compositions which are based on different cements. Thus, the copolymers of the present invention are broadly applicable and effective essentially independently of the nature of hydraulically setting compositions.

Especially, the structural units S1, S2, S3, and S4, if present, constitute together at least 50 mol-%, in particular at least 90 mol-%, preferably at least 95 mol-%, of the total number of all structural units of the copolymer.

In particular, the structural units S1, S2, S3, and S4, if present, have together a combined weight of at least 50 wt.-%, in particular at least 90 wt.-%, preferably at least 95 wt.-%, of the total weight of the comb polymer.

Especially, the copolymer consists only of structural units S1, S2, S3.

With regard to structural unit S1, the following structures have been proven to be especially beneficial. However, copolymers with other moieties and subunits may be suitable for specific purposes as well.

According to a preferred embodiment the copolymer features R$^1$=CH$_3$ and m=0. Thereby, the structural unit S1 is preferably derived from isopropenyl phosphonic acid, from a mono- or dialkalimetal salt of isopropenylphosphonic acid or from a mono- or diester thereof.

In another preferred embodiment the copolymer features R$^1$=H and m=0. In this case, the structural unit S1 is in particular derived from vinylphosphonic acid, a mono- or dialkalimetal salt of vinylphosphonic acid or from a mono- or diester thereof.

According to a further beneficial embodiment the copolymer features R$^1$=H and m=1. Thereby, the structural unit S1 is advantageously derived from allylphosphonic acid, from a mono- or dialkalimetal salt of allylphosphonic acid or from a mono- or diester thereof.

As well, a copolymer with R$^1$=CH$_3$ and m=1 can be beneficial. Given so, the structural unit S1 is preferably derived from methallylphosphonic acid, from a mono- or dialkalimetal salt of methallylphosphonic acid or from a mono- or diester thereof.

In particular, X$^1$ and X$^2$, independently of each other, are represented by hydrogen, an alkali metal ion, an alkali earth metal ion, or a divalent or trivalent metal ion. Especially X$^1$=X$^2$.

In view of structural unit S2, the following embodiments are in particular advantageous.

According to a preferred embodiment the copolymer features R$^3$=CH$_3$ and n=2. Thereby, structural unit S2 is preferably derived from a polyethylene glycol monoisoprenyl ether.

Another preferred copolymer features R$^3$=CH$_3$ and n=1. In this case, the structural unit S2 is in particular derived from a polyethylene glycol methallyl ether.

Especially, A$^2$ represents a C$_2$ and/or C$_3$ alkylene group, preferably a C$_2$ alkylene group, and/or p=25-80, preferably p=40-60.

In a preferred embodiment, -(A$^2$O)$_p$— represents a C$_2$ to C$_4$ polyoxyalkylene group, in particular a polyoxyethylene group or a polyoxypropylene group or mixtures of oxyethylene and oxypropylene units in any sequence, in particular random, alternating, or block-wise.

In a particularly preferred embodiment of the invention the copolymer has a proportion of ethylene oxide units of at least 30 mol %, preferably from 50 to 100 mol %, in particular from 80 to 100 mol % of the total number of all (A$^2$O)$_p$ units. Especially preferably structural unit S2 and/or the copolymer comprises only ethylene oxide units.

Preferably, R$^4$, independently of one another, is represented by a hydrogen atom or a C$_1$-C$_4$ alkyl group. Especially, R$^4$ stands for a hydrogen atom and/or a methyl group.

However, copolymers with other structural units S2 may be suitable for specific purposes as well.

For structural unit S3, the following configurations have been proven to be advantageous:

Preferably, R$^5$=H and/or CH$_3$. In particular, Y, independently of each other, is represented by hydrogen, an alkali metal ion, an alkali earth metal ion, or a divalent or trivalent metal ion.

According to a preferred embodiment, R$^5$ stands for hydrogen and Y, independent of each other, is represented by hydrogen, an alkali metal ion, an alkali earth metal ion, or a divalent or trivalent metal ion.

In another beneficial embodiment R$^5$ stands for hydrogen and Y is hydroxyethyl.

However, copolymers with other moieties and subunits may be suitable for specific purposes as well.

Structural unit S4, if present, is preferably derived from an ethylenically unsaturated monomer. Examples of structural units S4 can e.g. be derived from unsaturated dicarboxylic acids, e.g. maleic acid or fumaric acid, (meth)acryl amides, (meth)acryl esters and/or vinyl esters, such as for example vinyl acetate.

A first especially preferred copolymer has the following characteristics:
R$^1$=CH$_3$, m=0 and X$^1$ and X$^2$, independently of each other, are represented by hydrogen, an alkali metal ion, an alkali earth metal ion, or a divalent or trivalent metal ion;
R$^3$=CH$_3$, n=2, A$^2$=C$_2$ and/or C$_3$ alkylene and p=25-80, and
R$^5$=H and Y=hydrogen, an alkali metal ion, an alkali earth metal ion, or a divalent or trivalent metal ion.

A second preferred copolymer has the following characteristics:
R$^1$=CH$_3$, m=0, and X$^1$ and X$^2$, independently of each other, are represented by hydrogen, an alkali metal ion, an alkali earth metal ion, or a divalent or trivalent metal ion, and
R$^3$=CH$_3$, n=1, A$^2$=C$_2$ and/or C$_3$ alkylene and p=25-80, and $R^5$=H and Y=hydrogen, an alkali metal ion, an alkali earth metal ion, or a divalent or trivalent metal ion.

A third preferred copolymer has the following characteristics $R^1$=H, m=1, and $X^1$ and $X^2$, independent of each other, are represented by hydrogen, an alkali metal ion, an alkali earth metal ion, or a divalent or trivalent metal ion, and, $R^3$=$CH_3$, n=2, $A^2$=$C_2$ and/or $C_3$ alkylene, p=25-80, and $R^5$=H and Y=hydrogen, an alkali metal ion, an alkali earth metal ion, or a divalent or trivalent metal ion.

Preferably, the copolymer has a weight average molecular mass ($M_w$) in the range of 5'000 to 100'000 g/mol, particularly in the range of 10'000 to 100'000 g/mol. The weight average molecular weight is in particular measured using gel permeation chromatography (GPC) with Polyethylenglycol (PEG) as standard.

A further aspect of the present invention is an aqueous suspension comprising at least one copolymer according to the present invention. In particular the aqueous suspension is a chalk lime suspension, a $TiO_2$ suspension, or a clay suspension.

Another aspect of the present invention is a binder composition, in particular a hydraulically setting binder composition, comprising at least one copolymer according to the present invention and at least one mineral binder, preferably cement and/or gypsum.

Preferably, the mineral binder comprises or consists of a hydraulic binder, and optionally a latent hydraulic and/or pozzolanic binder material. In particular, the hydraulic binder is cement. Preferably, the latent hydraulic and/or pozzolanic binder material is slag and/or fly ash.

In particular, the binder composition comprises at least 30 wt.-% of gypsum, with respect to the total amount of binder in the composition. The gypsum comprises preferably at least one component selected from the group consisting of calcium sulfate dihydrate, calcium sulfate hemihydrate and anhydrite.

In the binder composition, the copolymer is preferably present in an amount of 0.01-10 wt.-%, in particular 0.05-5 wt.-%, especially 0.1-0.5 wt.-%, with respect to the amount of binder, e.g. cement and/or gypsum, in the binder composition.

Additionally, the binder composition can comprise aggregates, in particular sand, gravel and/or crushed stone. In this case, the binder composition can be used as a mortar composition and/or a concrete composition.

The binder composition can be present in dry state, e.g. as a ready-mix mortar or concrete composition.

Moreover, the binder composition can preferably comprise water. A suitable ratio of water to the filler material is in the range of 0.2-0.8, in particular 0.3-0.5. Such binder compositions can directly be used as slurries for mortar and/or concrete compositions.

Especially the binder composition is a cementitious composition, a plaster composition, a mortar or a concrete.

Furthermore the present invention concerns several uses of the copolymer:

Specifically, the copolymer can be used for improving the processing of hydraulically setting compositions.

As well, the copolymer can be used as plasticizer for hydraulically setting compositions, in particular mineral binder compositions, especially cement compositions.

The copolymer according to the present invention can also be used as a slump life extender for hydraulically setting compositions, in particular mineral binder compositions.

Additionally the copolymer can advantageously be used as a water reducer for hydraulically setting compositions, in particular mineral binder compositions.

The copolymer can be added to a hydraulically setting composition with or shortly before or shortly after the addition of the water. It has been found to be particularly suitable here to add the copolymer in the form of an aqueous solution or dispersion, especially as mixing water or as part of the mixing water. The aqueous solution or dispersion is prepared, for example, by adding water when manufacturing the copolymer or by subsequent mixing with water. Depending on the copolymer type, a dispersion or a solution is formed, with a uniform solution being preferred.

However, the copolymer can also be added to a hydraulically setting composition before or during the grinding of the composition, for example, the grinding of cement clinker to produce cement.

According to an advantageous embodiment, at least a portion of the copolymer is added to at least one component of the hydraulically setting composition before and/or during a grinding process. In an advantageous embodiment, all of the copolymer is added before and/or during the grinding process.

Independently of an improvement of the processing of hydraulically setting compositions, the copolymer used according to the invention can also be used as a grinding aid, in particular for improving the grinding efficiency, in a grinding process. In this process, the copolymer is usually capable of improving the efficiency of the grinding process. Advantageously, the copolymer is used both for improving the processing of hydraulically setting compositions and at the same time as a grinding aid.

The grinding process can include in particular the grinding of cement raw materials, cement clinker, cement and/or cement additives. Cement additives can be slag sands, pozzolans, fly ashes, and/or limestone.

In principle, the grinding process can be performed in the form of a wet, a semi-wet, or a dry grinding process. Contrary to the dry grinding process, in the wet and the semi-wet grinding processes the material to be ground is mixed and ground in the wet state. In particular, the grinding process is performed in the form of a dry grinding process.

Another aspect of the present invention is directed to a method for the preparation of a copolymer as defined above, comprising a copolymerization of:

i) 1 to 30 mol-%, especially 5 to 30 mol-%, in particular 10 to 20 mol-%, of at least one monomer M1 of formula IV

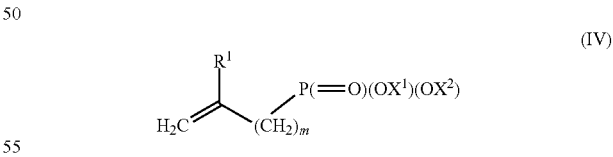

(IV)

ii) 10 to 80 mol-%, especially 20 to 40 mol-%, in particular 25 to 30 mol-%, of at least one monomer M2 of formula V

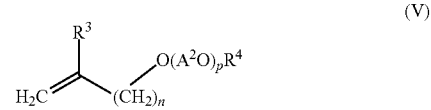

(V)

iii) 5 to 80 mol-%, especially 25 to 70 mol-%, in particular 50 to 70 mol-%, of at least one monomer M3 of formula VI

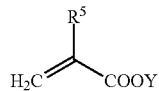

iv) 0 to 40 mol-%, especially 0 to 25 mol-%, of an additional monomer M4 which differs from the monomers M1, M2 and M3,
whereby $R^1$, $R^3$, $R^4$, $R^5$, $X^1$, $X^2$, $A^2$, Y, m, n and p are defined as above.

Preferably, the copolymerization is carried out in presence of a radical initiator and/or in the presence of a chain transfer agent.

Especially, the copolymerisation is carried out at a pH value of 2 to 4 and/or at a temperature in the range of 10° C. to 150° C., preferably 20° C. to 120° C.

A suitable radical initiator is based on a redox system. Especially, the redox system-based initiator comprises a reducing agent and a radical forming compound. The radical forming compound is in particular selected from the group comprising an alkali or earth alkali metal-hydroxymethane sulfinate, an alkali or earth alkali metal sulfite, ascorbic acid, ketoenoles and a peroxy compound. A preferred peroxy compound is hydrogen peroxide.

The chain transfer agent is especially a alkali phosphinate, a phosphinic acid which is monosubstituted by an organic rest or the alkali metal salt of such a monosubstituted phosphinic acid.

In particular the chain transfer agent is a organic thiol compound or a derivative of a organic thiol compound.

According to a preferred embodiment, the monomer M1 is preferably isopropenyl phosphonic acid, a mono- or dialkalimetal salt of isopropenylphosphonic acid or a mono- or diester thereof.

In another preferred embodiment, the monomer M1 is vinylphosphonic acid, a mono- or dialkalimetal salt of vinylphosphonic acid or a mono- or diester thereof.

According to a further beneficial embodiment, the monomer M1 is allylphosphonic acid, a mono- or dialkalimetal salt of allylphosphonic acid or a mono- or diester thereof.

As well, monomer M1 can be methallylphosphonic acid, a mono- or dialkalimetal salt of methallylphosphonic acid or a mono- or diester thereof.

Thereby, in particular, $X^1$ and $X^2$, independently of each other, are represented by hydrogen, an alkali metal ion, an alkali earth metal ion, or a divalent or trivalent metal ion. Especially $X^1=X^2$.

According to a preferred embodiment monomer M2 is a polyethylene glycol monoisoprenyl ether.

Another preferred monomer M2 is a polyethylene glycol methallyl ether.

Especially, $A^2$ represents a $C_2$ and/or $C_3$ alkylene group, preferably a $C_2$ alkylene group, and/or p=25-80, preferably p=40-60.

Preferably, monomer M3 is acrylic acid and/or a salt, in particular an alkali metal salt, thereof.

According to another preferred embodiment, monomer M3 is hydroxyethyl acrylate.

Monomer M4, if present, is preferably an ethylenically unsaturated monomer. Examples of monomers M4 are e.g. unsaturated dicarboxylic acids, e.g. maleic acid or fumaric acid, (meth)acryl amides, (meth)acryl esters and/or vinyl esters, such as for example vinyl acetate.

EXAMPLES

In the following, specific methods for producing several copolymers of the present invention (examples E1 to E8) and their effects on cementitious compositions are explained in detail. The copolymers according to the invention have been compared with two comparative polymers (examples E9 and E10). In order to allow for a meaningful comparison between the different copolymers, all polymer solutions have been adjusted to 40 wt.-% solids content and thus feature the same polymer concentration.

However it should be noted that that the presents examples are given for illustrative purposes only and are not supposed to limit the invention, as defined by the claims, appended hereto.

1. Synthesis of Copolymers

1.1 Example E1

Copolymer CP1

Copolymer based on isopropenyl phosphonic acid, polyethylene glycol monoisoprenylether-2400 and acrylic acid in a molar ratio of 0.05:0.25:0.70.

The following solutions 1 to 3 were prepared separately:
Solution 1:
12.2 g (0.05 mol) Isopropenyl phosphonic acid (50 wt-% aqueous solution)
50.4 g (0.70 mol) Acrylic acid
100 g Water
Solution 2:
100 g Water
6 g Sodium hypophosphite
4.5 g Rongalit C (Hydroxymethanesulfinic acid, sodium salt)
0.8 g Ferrous sulphate heptahydrate
Solution 3:
9 g Hydrogen peroxide(35 wt.-% aqueous solution)
15 g Water To a 2 liter glass reactor, equipped with a mechanical stirrer, a reflux condenser, a thermometer and a feed inlet with automatic dosing devices were added 600 g of water, 600 g (0.167 mol) polyethylene glycol monoisoprenyl ether-2400 (prepared by ethoxylation of 3-methyl-3-butene-1-ol with ca.50 mol of ethylene oxide), and 2.40 g of sodium hypophosphite dissolved in 8 g of water The mixture was stirred and thermostated at 25° C. Then 33 wt.-% of the amount of solution 1 (54.2 g) is added quickly to the stirred reactor, then the rest of solution 1 and solution 2 and 3 were simultaneously added.

Solution 1 was added over a period of 15 minutes, solutions 2 and 3 over 25 minutes respectively.

After the completion of the additions the temperature was kept another 20 minutes at 30-35° C. until the peroxide content had dropped to zero and the polymer content remained constant which was indicated by UPLC (ultra performance liquid chromatography).

The clear, slightly yellow polymer solution with 43.1 wt.-% solids content was adjusted to 40 wt.-% solids content by the addition of an appropriate amount of water.

1.2 Example E2

Copolymer CP2

Copolymer based on isopropenyl phosphonic acid, polyethylene glycol monomethallylether-2400 and acrylic acid in a molar ratio of 0.05:0.40:0.55.

The following solutions 1 to 3 were prepared separately:
Solution 1:
12.2 g (0.05 mol) Isopropenyl phosphonic acid (50 wt.-% aqueous solution)
39.6 g (0.55 mol) Acrylic acid
100 g Water
Solution 2:
100 g Water
5 g Sodium hypophosphite
4.5 g Rongalit C (Hydroxymethanesulfinic acid, sodium salt)
0.8 g Ferrous sulphate heptahydrate
Solution 3:
9 g Hydrogen peroxide (35 wt.-% aqueous solution)
15 g Water To a 3 liter-glass reactor, equipped with a mechanical stirrer, a reflux condenser, a thermometer and a feed inlet with automatic dosing devices were added 960 g of water, 960 g (0.40 mol) polyethylene glycol monomethallylether-2400 (prepared by ethoxylation of methallyl alcohol with ca.50 mol of ethylene oxide, and 2.40 g of sodium hypophosphite dissolved in 8 g of water. The mixture was stirred and thermostated at 30° C. Then 33 wt.-% of the amount of solution 1 (50.6 g) is added quickly to the stirred reactor, then the rest of solution 1 and solution 2 and 3 were simultaneously added.

Solution 1 was added over a period of 30 minutes, solutions 2 and 3 over 45 minutes respectively. After the completion of the additions the temperature was kept another 20 minutes at 30-35° C. until the peroxide content had dropped to zero and the polymer content remained constant which was indicated by UPLC.

The clear, slightly yellow polymer solution with 44.1 wt.-% solids content was adjusted to 40 wt.-% solids content by the addition of an appropriate amount of water.

1.3 Example E3

Copolymer CP3

Copolymer based on isopropenyl phosphonic acid, polyethylene glycol monoisoprenyl ether-2400 and acrylic acid in a molar ratio of 0.2:0.17:0.50.

The following solutions 1 to 3 were prepared separately:
Solution 1:
48 g (0.20 mol) Isopropenyl phosphonic acid (50 wt.-% aqueous solution)
36 g (0.50 mol) Acrylic acid
100 g Water
Solution 2:
100 g Water
4 g Sodium hypophosphite
3 g Ascorbic acid
4 g Ferrous sulphate heptahydrate
Solution 3:
9 g Hydrogen peroxide (35 wt.-% aqueous solution)
15 g Water To a 2 liter glass reactor, equipped with a mechanical stirrer, a reflux condenser, a thermometer and a feed inlet with automatic dosing devices were added 400 g of water, 400 g (0.167 mol) isoprenyl-polyethylene glycol-2400 (prepared by ethoxylation of 3-methyl-3-butene-1-ol with ca.50 mol of ethylene oxide), and 2.40 g of sodium hypophosphite dissolved in 8 g of water. The mixture was stirred and heated to 58-60° C. and the addition of solutions 1, 2 and 3 were then simultaneously started.

Solution 1 was added over a period of 60 minutes, solutions 2 and 3 over 90 minutes respectively.

After the completion of the additions the temperature was kept another 15-20 minutes at 60° C. until the peroxide content had dropped to zero and the polymer content remained constant which was indicated by UPLC.

The clear, slightly yellow polymer solution with 41.5 wt.-% solids content was adjusted to 40 wt.-% solids content by the addition of an appropriate amount of water.

1.4 Example E4

Copolymer CP4

Copolymer based on isopropenyl phosphonic acid, polyethylene glycol monomethallyl ether and acrylic acid in a molar ratio of 0.20:0.30:0.50.

The following solutions 1 to 3 were prepared separately:
Solution 1:
48 g (0.20 mol) Isopropenyl phosphonic acid (50 wt. % aqueous solution)
36 g (0.50 mol) Acrylic acid
100 g Water
Solution 2:
100 g water
4 g Sodium hypophosphite
3 g Ascorbic acid
4 g Ferrous sulphate heptahydrate
Solution 3
9 g Hydrogen peroxide(35 wt.-% aqueous solution)
15 g Water To a 2 liter glass reactor, equipped with a mechanical stirrer, a reflux condenser, a thermometer and a feed inlet with automatic dosing devices were added 720 g of water, 720 g (0.30 mol) polyethylene glycol monomethallyl ether-2400 (prepared by ethoxylation of methallylalcohol with ca. 50 mol of ethylene oxide), and 2.40 g of sodium hypophosphite dissolved in 8 g of water. The mixture was stirred and heated to 58-60° C. and the addition of solutions 1, 2 and 3 were then simultaneously started.

Solution 1 was added over a period of 60 minutes, solutions 2 and 3 over 90 minutes respectively.

After the completion of the additions the temperature was kept another 15-20 minutes at 60° C. until the peroxide content had dropped to zero and the polymer content remained constant which was indicated by UPLC.

The clear, slightly yellow polymer solution with 42.8 wt.-% solids content was adjusted to 40 wt.-% solids content by the addition of an appropriate amount of water.

1.5 Example E5

Copolymer CP5

Copolymer based on isopropenyl phosphonic acid, polyethylene glycol monoisoprenylether-2400, hydroxyethyl acrylate and acrylic acid in a molar ratio of 0.20:0.30:0.25:0.25.

The following solutions 1 to 3 were prepared separately:
Solution 1:
48 g (0.20 mol) Isopropenyl phosphonic acid (50 wt. % aqueous solution)
29 g (0.25 mol) Hydroxyethyl acrylate
18 g (0.25 mol) Acrylic acid
100 g Water
Solution 2:
100 g Water
4 g Sodium hypophosphite
3 g Ascorbic acid
4 g Ferrous sulphate heptahydrate
Solution 3:
9 g Hydrogen peroxide (35 wt-% aqueous solution)
15 g Water To a 2 liter glass reactor, equipped with a mechanical stirrer, a reflux condenser, a thermometer and a feed inlet with automatic dosing devices were added 720 g of water, 720 g (0.30 mol) polyethylene glycol monoisoprenyl ether-2400 (prepared by ethoxylation of 3-methyl-3-butene-1-ol with ca. 50 mol of ethylene oxide), and 2.40 g of sodium hypophosphite dissolved in 8 g of water. The mixture was stirred and heated to 58-60° C. and the addition of solutions 1, 2 and 3 were then simultaneously started.

Solution 1 was added over a period of 60 minutes, solutions 2 and 3 over 90 minutes respectively. After the completion of the additions the temperature was kept another 15-20 minutes at 60° C. until the peroxide content had dropped to zero and the polymer content remained constant which was indicated by UPLC.

The clear, slightly yellow polymer solution with 42.3 wt.-% solids content was adjusted to 40 wt.-% solids content by the addition of an appropriate amount of water.

1.6 Example E6

Copolymer CP6

Copolymer of isopropenyl phosphonic acid, polyethylene glycol monomethallylether-2400, hydroxyethylacrylate and acrylic acid in a molar ratio of 0.20:0.30:0.25:0.25.

The following solutions 1 to 3 were prepared separately:
Solution 1:
48 g (0.20 mol) Isopropenyl phosphonic acid (50 wt.-% aqueous solution)
29 g (0.25 mol) Hydroxyethyl acrylate
18 g (0.25 mol) Acrylic acid
100 g Water
Solution 2:
100 g water
4 g Sodium hypophosphite
3 g Ascorbic acid
4 g Ferrous sulphate heptahydrate
Solution 3:
9 g Hydrogen peroxide (35 wt-% aqueous solution)
15 g Water To a 2 liter glass reactor, equipped with a mechanical stirrer, a reflux condenser, a thermometer and a feed inlet with automatic dosing devices were added 720 g of water, 720 g (0.30 mol) polyethylene glycol monomonomethallyl ether-2400 (prepared by ethoxylation of methallyl alcohol with ca. 50 mol of ethylene oxide) and 2.40 g of sodium hypophosphite dissolved in 8 g of water. The mixture was stirred and heated to 60-62° C. and the addition of solutions 1, 2 and 3 were then simultaneously started.

Solution 1 was added over a period of 60 minutes, solutions 2 and 3 over 90 minutes respectively.

After the completion of the additions the temperature was kept another 15-20 minutes at 60° C. until the peroxide content had dropped to zero and the polymer content remained constant which was indicated by UPLC.

The clear, slightly yellow polymer solution of 42.3 wt.-% solids content was adjusted to 40 wt.-% solids content by the addition of an appropriate amount of water.

1.7 Example E7

Copolymer CP7

Copolymer of vinyl phosphonic acid, polyethylene glycol monoisoprenyl ether-2400 and acrylic acid in a molar ratio of 0.20:0.30:0.50.

The following solutions 1 to 3 were prepared separately:
Solution 1:
43.2 (0.20 mol) Vinyl phosphonic acid (50 wt.-% aqueous solution)
36 g (0.50 mol) Acrylic acid
100 g Water
Solution 2:
100 g Water
4 g Sodium hypophosphite
3 g Ascorbic acid
4 g Ferrous sulphate heptahydrate
Solution 3:
9 g Hydrogen peroxide (35 wt.-% aqueous solution)
15 g Water To a 2 liter glass reactor, equipped with a mechanical stirrer, a reflux condenser, a thermometer and a feed inlet with automatic dosing devices were added 720 g of water, 720 g (0.30 mol) polyethylene glycol monoisoprenyl ether-2400 (prepared by ethoxylation of 3-methyl-3-butene-1-ol with ca. 50 mol of ethylene oxide) and 2.40 g of sodium hypophosphite dissolved in 8 g of water. The mixture was stirred and heated to 58-60° C. and the addition of solutions 1, 2 and 3 were then simultaneously started.

Solution 1 was added over a period of 60 minutes, solutions 2 and 3 over 90 minutes respectively.

After the completion of the additions the temperature was kept another 15-20 minutes at 60° C. until the peroxide content had dropped to zero and the polymer content remained constant which was indicated by UPLC.

The clear, slightly yellow polymer solution of 41.3 wt.-% solids content was adjusted to 40 wt.-% solids content by the addition an appropriate amount of water.

1.8 Example E8

Copolymer CP8

Copolymer of vinyl phosphonic acid, polyethylene glycol monomethallyl ether-2400 and acrylic acid in a molar ratio of 0.20:0.30:0.50.

The following solutions 1 to 3 were prepared separately:
Solution 1:
43.2 (0.20 mol) Vinyl phosphonic acid (50 wt.-% aqueous solution)
36 g (0.50 mol) Acrylic acid
100 g Water Solution 2:
100 g Water
4 g Sodium hypophosphite
3 g Ascorbic acid
4 g Ferrous sulphate heptahydrate
Solution 3:
9 g Hydrogen peroxide (35 wt.-% aqueous solution)
15 g Water To a 2 liter glass reactor, equipped with a mechanical stirrer, a reflux condenser, a thermometer and a feed inlet with automatic dosing devices were added 720 g of water, 720 g (0.30 mol) polyethylene glycol monomethallyl ether-2400 (prepared by ethoxylation of methallyl alcohol with ca. 50 mol of ethylene oxide), and 2.40 g of sodium hypophosphite dissolved in 8 g of water. The mixture was stirred and heated to 58-60° C. and the addition of solutions 1, 2 and 3 were then simultaneously started.

Solution 1 was added over a period of 60 minutes, solutions 2 and 3 over 90 minutes respectively.

After the completion of the additions the temperature was kept another 15-20 minutes at 60° C. until the peroxide content had dropped to zero and the polymer content remained constant which was indicated by UPLC.

The clear, slightly yellow polymer solution of 41.5 wt.-% solids content was adjusted to 40 wt.-% solids content by the addition an appropriate amount of water.

1.9 Comparative Example E9

Copolymer VP1

Copolymer based on polyethylene glycol monoisoprenyl ether-2400 and acrylic acid in a molar ratio of 0.3:1.0.

The following solutions 1 and 2 were prepared separately:
Solution 1:
2 g Mercaptoacetic acid
1 g Ascorbic acid
200 g Water
Solution 2:
72 g (1 mol) Acrylic acid
160 g Water To a 2 liter glass reactor, equipped with a mechanical stirrer, a reflux condenser, a thermometer and a feed inlet with automatic dosing devices were added 790 g of water, 720 g (0.31 mol) polyethylene glycol monoisoprenyl ether-2400 (prepared by ethoxylation of 3-methyl-3-butene-1-ol with ca. 50 mol of ethylene oxide), and, within a period of 10 minutes, 3 g hydrogen peroxide (35 wt.-% aqueous solution) dissolved in 40 g of water.

The mixture was stirred and thermostated at 60° C. and the addition of solutions 1, and 2 were then simultaneously started and added over periods of 3.5 and 3 hours respectively. After the completion of the additions the temperature was kept another 1 hour at 60° C. until the peroxide content had dropped to zero and the polymer content remained constant which was indicated by UPLC.

A clear, slightly yellow polymer solution of 40 wt.-% solids content was obtained.

1.10 Comparative Example E10

SNFP

Sulfonated naphthalene-formaldehyd polymer (SNFP) MIGHTY-150 (KAO Corp. Tokyo), a commercial dispersing agent for hydraulic cement containing preparations, is the sodium salt of a sulfonated naphthalene-formaldehyde polycondensate of average molecular weight of 5'000-6'000 g/mol.

2. Flow Properties with Different Polymers

The following examples demonstrate the improved effect of the inventive polymers on fluidity and workability of fresh concrete. The inventive polymers CP1 to CP8 (Examples E1 to E8) were tested as 40 wt.-% solutions in plastic and flowing concrete. Comparative Polymers VP1 and VP2 (Examples E9 and E10) were also tested and compared in this context.

The consistency of freshly prepared concrete i.e. the mobility or viscosity is the most important characteristic of workability. For measuring the consistency of the concrete samples containing the inventive and comparative polymers, the "slump test" according to ASTM C143 and the "flow table spread according to DIN 1048, part 1, were applied: Three layers of concrete were put into a mold having a shape of a truncated cone and having certain dimensions. The contents were compressed with 25 pushes of an iron bar. At the top, the concrete is stripped off evenly, the form was vertically removed. The slump was measured by determining the vertical difference between the top of the mold and the displaced original center of the top surface of the test sample.

The flow table spread was determined by placing concrete into an iron form on a two-part table. By removing the form, a concrete body having a truncated cone shape was prepared. Then, the area of the table is lifted on one side for 4 cm, and allowed to fall; this procedure is carried out 15 times while the concrete is spreading on the table. The average diameter of the formed cake corresponds to the flow table spread.

In order to compare the obtained test results and to bring them into relation with the consistency, the freshly prepared concrete may be classified in consistency ranges as shown in Table 1:

TABLE 1

| Consistency ranges of fresh concrete (DIN 18555, part 2) | | |
|---|---|---|
| Consistency Notation | Slump [cm] | Flow Table Spread [cm] |
| K1 = rigid | <1 | <30 |
| K2 = semi-plastic | 1 to 9 | 30 to 40 |
| K3 = plastic | 10 to 15 | 41 to 50 |
| K4 = flowing concrete | >15 | >50 |

Flowing concrete is used, when high inserting rates (e.g. from 50 to 150 m³/hour) are required, or when the form and reinforcement of a construction part do not allow a compacting of the concrete by vibration.

Concrete having K2 or K3 consistencies may be prepared by adding instead of high amounts of water polymeric fluidizers (also designated as superplasticizers), when increased mechanical strength at an equal remaining workability is required.

For a freshly prepared concrete the flow properties are depending upon the dosage of the superplasticizer and on the composition of the fresh concrete mixture. Usually, from 0.2 to 1.5% solid matter quantities (in dissolved aqueous form) in relation to the cement content of the concrete are added.

TABLE 2

Composition of fresh concrete mixture used for test examples.

| Component | Quantity [kg] |
|---|---|
| Normal Portland Cement Type 1 | 7.5 |
| Chalk filler | 1.5 |
| Sand, grain size up to 1.2 mm | 9.5 |
| Sand, grain size 1.2 to 4.0 mm | 8.0 |
| Sand, grain size 4.0 to 8.0 mm | 4.5 |
| Mine gravel 8 to 16 mm | 9.5 |
| Mine gravel 16 to 32 mm | 17.0 |
| Total mixing water | 3.4 |
| Fluidizer (40 wt.-% solution of polymers E1-E10) | 0.05 |

The cement and aggregates are premixed for 15 seconds in a 50 liter forced-circulation mixer for concrete. The mixing water, containing one of the 40 wt.-% copolymer solutions described in examples E1 to E10, was added slowly under stirring over a period of 20 seconds. The batch was then mixed in a wet state for an additional 60 seconds. A part of the fresh concrete was then immediately filled into the mold for the determination of the flow table spread and the slump.

Concrete test mixtures T1 to T10 were prepared and tested according to the procedure described above. Flow table spread and slump were measured immediately after mixing and measured again after 60 and 120 minutes respectively. A mixing up of the concrete for 5 seconds was carried out before each new measurement. The results are summarized in Table 3.

TABLE 3

Time-dependent flow behaviour of concrete with a water to cement ratio w/c = 0.47 using inventive and comparative polymer solutions of 40 wt.-% strength.

| Test mixture | Polymer/ Example | Dosage [wt.-% of cement] | Slump/Flowtable Spread [cm] x minutes after mixing | | |
|---|---|---|---|---|---|
| | | | x = 0 | x = 60 | x = 120 |
| T1 | E1 | 0.60 | 21/59 | 21/57 | 20/55 |
| T2 | E2 | 0.60 | 20/60 | 22/58 | 20/57 |
| T3 | E3 | 0.60 | 23/60 | 21/59 | 20/58 |
| T4 | E4 | 0.60 | 21/61 | 20/60 | 19/57 |
| T5 | E5 | 0.60 | 16/51 | 18/55 | 21/57 |
| T6 | E6 | 0.60 | 15/50 | 18/55 | 20/57 |
| T7 | E7 | 0.60 | 21/61 | 22/60 | 21/60 |
| T8 | E8 | 0.60 | 22/60 | 22/60 | 20/57 |
| T9 | E9 | 0.60 | 19/57 | 18/55 | 16/53 |
| T10 | E10 | 0.60 | 12/43 | — | — |

Table 3 shows a surprisingly long lasting slump life and a almost constant flow table spread of test samples containing inventive copolymers over a period of 120 minutes.

On the other hand, comparative test mixtures T9 and T10 show a considerable stiffening tendency already 60 minutes after mixing.

3. Sensitivity of Polymers on Cement Quality

In the following experiments, a series of flow test with concrete based on cements from different regions treated with different polymers and has been performed. For testing, 4 Ordinary Portland Cements (OPC) from 4 different regions of China (North, East, South, West) were selected and used in a Chinese standard mix concrete of grade C30. The specification of the concrete mix is given in table 4.

TABLE 4

Concrete mix used for experiments

| Component | Type | Amount [kg/m$^3$] |
|---|---|---|
| Cement | OPC 42.5* | 280 |
| Fly ash | | 80 |
| Fine aggregates | River Sand 2.5 mm | 726 |
| Coarse aggregates | Crushed stone 16-31.5 mm | 1089 |
| Water | | 185 |

*From 4 different regions

The following polymers were used for these series of experiments:

Polymer A: Polymer A is similar to copolymer VP1 (comparative example E9) but with polyethyleneglycol acrylate instead of polyethylenegylcol isoprenyl ether.

Polymer B: Polymer B is similar to copolymer VP1 (comparative example E9) but with polyethyleneglycol allylether instead of polyethylenegylcol isoprenylether.

Polymers E7 and E9 as described above.

These polymers were compared regarding their slump keeping capability in concrete compositions with cements from different regions. All polymers were used in the form of aqueous solutions with a solid content of 20 wt.-%. Corresponding results are given in table 5.

TABLE 5

Effects of polymers A, B, E7 and E9 in concrete mixes according to table 4 with cements from different regions.

| Origin of cement/ dosage of polymer [wt.-%] | Polymer | Slump [cm] after x minutes | | |
|---|---|---|---|---|
| | | x = 0 | x = 60 | x = 120 |
| North/0.75 | A | 22.5 | 20.0 | 14.0 |
| | B | 20.5 | 18.0 | 8.0 |
| | E9 | 21.5 | 19.0 | <5 |
| | E7 | 22.0 | 22.0 | 19.5 |
| East/0.8 | A | 22.0 | 19.0 | 12 |
| | B | 21.0 | 16.0 | <5 |
| | E9 | 21.5 | 20.0 | 17.0 |
| | E7 | 21.0 | 21.0 | 21.0 |
| South/0.8 | A | 22.0 | 20.5 | 12 |
| | B | 20.5 | 13.0 | <5 |
| | E9 | 20.0 | 18.0 | 10.0 |
| | E7 | 21.0 | 20.5 | 20.5 |
| West/0.85 | A | 22.0 | 19.0 | 14 |
| | B | 20.5 | 17.5 | <5 |
| | E9 | 21.5 | 20.0 | 16.0 |
| | E7 | 21.5 | 21.0 | 20.0 |

Due to their different origins, cements from different regions will have slightly different compositions and properties. As can be deduced from table 5, polymers according to the present invention (polymer E7) are much less sensitive to such variations in cement compositions than other polymers (polymers A, B and E9).

Nevertheless, the water reduction rate of the polymers according to the invention is comparable to standard acrylate based polymers such as polymer A.

The invention claimed is:

1. A copolymer comprising:
   i) 1 to 30 mol-% of at least one structural unit S1 of formula I

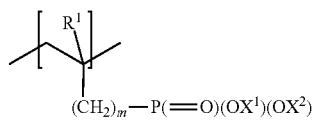
   (I)

where
   $R^1$, independently of one another, is H or $CH_3$;
   m, independently of one other, is represented by one of the integers 0, 1, 2 or 3;
   $X^1$ and $X^2$, independently of one other, is hydrogen, an alkali metal ion, an alkaline earth metal ion, a di- or trivalent metal ion, an ammonium ion or an organic ammonium group, a $C_1$-$C_3$ alkyl group, a hydroxyethyl group, a hydroxypropyl group or a group of formula $(A^1O)_k$—$R^2$, wherein
   $A^1$, independently of one another, is represented by a $C_2$-$C_4$ alkylene group;
   $R^2$, independently of each other, is a hydrogen atom, a $C_1$-$C_{10}$ alkyl group, a phenyl group or a $C_7$-$C_{12}$ arylalkyl group, k, independently of one other, is represented by an integer of from 2 to 350;
   ii) 10 to 80 mol-% of at least one structural unit S2 of formula II

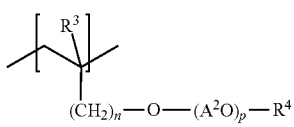
   (II)

where
   $R^3$, independently of one another, is H or $CH_3$;
   $R^4$, independently of one another, is represented by a hydrogen atom, a $C_1$-$C_{10}$ alkyl group, a phenyl group or a $C_7$-$C_{12}$ arylalkyl group; $A^2$, independently of one another, is represented by a $C_2$-$C_4$ alkylene group;
   n, independently of one another, is represented by an integer from 0 to 2;
   p, independently of one another, is represented by an integer from 1 to 350;
   iii) 5 to 80 mol-% of at least one structural unit S3 of formula III

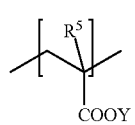
   (III)

where
   $R^5$, independently of one another, is H or $CH_3$;
   Y, independently of one another, is represented by hydrogen, an alkali metal ion, an alkali earth metal ion, a divalent or trivalent metal ion, a $C_1$-$C_3$ alkyl group, a hydroxyalkyl with 1 to 4 carbon atoms, or a rest of formula $(A^3O)_q$, where
   $A_3$, independently of one another, is represented by a $C_2$-$C_4$ alkylene group and
   q, independently of one another, is represented by an integer from 1 to 350;
   iv) 0 to 40 mol-% of at least one additional structural unit S4 which differs from the structural units S1, S2 and S3.

2. The copolymer according to claim 1, wherein $R^1$=$CH_3$ and m=0.

3. The copolymer according to claim 1, wherein $R^1$=H and m=0.

4. The copolymer according to claim 1, wherein $R^1$=H and/or $CH_3$, and wherein m=1.

5. The copolymer according to claim 1, wherein $X^1$ and $X^2$, independently of each other, are represented by hydrogen, an alkali metal ion, an alkali earth metal ion, or a divalent or trivalent metal ion.

6. The copolymer according to claim 1, wherein $R^3$=$CH_3$ and n=2.

7. The copolymer according to claim 1, wherein $R^3$=$CH_3$ and n=1.

8. The copolymer according to claim 1, wherein $A^2$ represents a $C_2$ and/or $C_3$ alkylene group.

9. The copolymer according to claim 1, wherein $R^5$=H or $CH_3$ and wherein Y=hydrogen, an alkali metal ion, an alkali earth metal ion, or a divalent or trivalent metal ion.

10. The copolymer according to claim 1, wherein $R^5$=H and Y=hydroxyethyl.

11. The copolymer according to claim 1, wherein
    $R^1$=$CH_3$, m=0, and $X^1$ and $X^2$, independently of each other, are represented by hydrogen, an alkali metal ion, an alkali earth metal ion, or a divalent or trivalent metal ion,
    $R^3$=$CH_3$, n=2, $A^2$=$C_2$ and/or $C_3$ alkylene group, and p=25-80, and
    $R^5$=H and Y=hydrogen, an alkali metal ion, an alkali earth metal ion, or a divalent or trivalent metal ion.

12. The copolymer according to claim 1, wherein
    $R^1$=$CH_3$, m=0, and $X^1$ and $X^2$, independently of each other, are represented by hydrogen, an alkali metal ion, an alkali earth metal ion, or a divalent or trivalent metal ion,
    $R^3$=$CH_3$, n=1, $A^2$=$C_2$ and/or $C_3$ alkylene group, p=25-80, and
    $R^5$=H and Y=hydrogen, an alkali metal ion, an alkali earth metal ion, or a divalent or trivalent metal ion.

13. The copolymer according to claim 1, wherein
    $R^1$=H, m=1, and $X^1$ and $X^2$, independent of each other, are represented by hydrogen, an alkali metal ion, an alkali earth metal ion, or a divalent or trivalent metal ion,
    $R^3$=$CH_3$, n=2 and $X^1$=$X^2$=H, $A^2$=$C_2$ and/or $C_3$ alkylene group, p=25-80, and
    $R^5$=H and Y=hydrogen, an alkali metal ion, or a divalent or trivalent metal ion.

14. Binder composition, a concrete or a cementitious composition, or a plaster, comprising at least one copolymer according to claim 1 and at least one mineral binder.

15. A method comprising: improving the processing of hydraulically setting compositions with a copolymer according to claim 1.

16. A method for the preparation of a copolymer according to claim 1, comprising a copolymerization of:
  i) 1 to 30 mol-% of at least one monomer M1 of formula IV

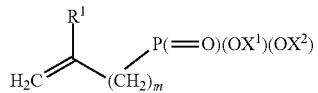

(IV)

ii) 10 to 80 mol-% of at least one monomer M2 of formula V

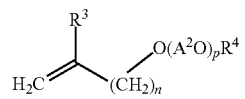

(V)

iii) 5 to 80 mol-% of at least one monomer M3 of formula VI

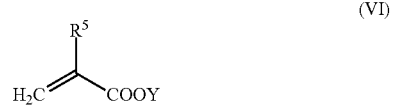

(VI)

iv) 0 to 40 mol-% of an additional monomer M4 which differs from the mon-omers M1, M2 and M3, whereby $R^1$, $R^3$, $R^4$, $R^5$, $X^1$, $X^2$, $A^2$, Y, m, n and p are defined as in claim 1.

* * * * *